UNITED STATES PATENT OFFICE 2,600,806

POLY N-VINYL SULFONAMIDES

Delbert D. Reynolds and William O. Kenyon, Rochester, N. Y., assignors to Eastman Kodak Company, Rochester, N. Y., a corporation of New Jersey No Drawing. Application June 25, 1949, Serial No. 101,478

6 Claims. (Cl. 260—79.3)

This invention relates to poly N-vinyl sulfonamides and to a process for their preparation.

In a copending application Serial No. 670,536, filed May 17, 1946 (now United States Patent 2,475,424, dated July 5, 1949), in the names of Joseph B. Dickey and Theodore E. Stanin, the preparation of the monomeric and polymeric N-vinyl N-alkyl (or N-aryl) sulfonamides having the general formula:

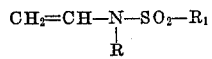

wherein R and $R_1$ each represents an alkyl or an aryl group, are described. The above monomers were prepared in accordance with the general method described by Kharasch and Priestley, J. Amer. Chem. Soc. 61, 3425 (1939). This method consisted of the addition of N-haloamides to ethylene, followed by the removal of HX. However, as pointed out by Kharasch and Priestley, this type of monomer cannot be prepared when R is hydrogen because cyclization results spontaneously with the formation of a substituted ethyleneimine derivative. Specifically, these investigators showed that when N,N-dibromo-p-toluene sulfonamide was added to styrene and the resulting addition product was treated with aqueous or alcoholic alkali solution, the N-p-tolyl sulfonyl derivative of phenylethyleneimine was obtained

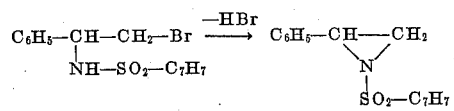

A similar transformation was obtained by Adams and Cairns, J. Amer. Chem. Soc. 61, 2464 (1939), when they found that the p-bromobenzenesulfonyl derivative of 1-amino-2-methyl-2-propanol could be converted into the corresponding chloro compound by means of concentrated hydrochloric acid, and that the latter with aqueous alkali solution yielded the ethyleneimine derivative

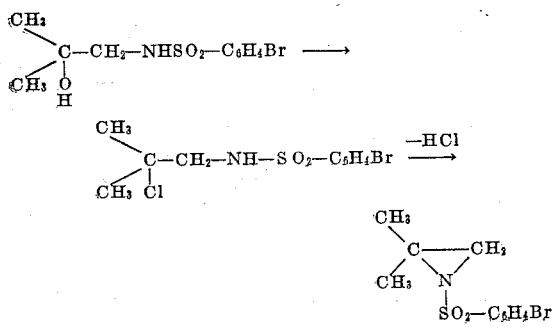

From the above mentioned results, it would not be expected that monomeric N-vinyl sulfonamides having the general formula,

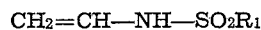

could exist, and thus far they have not been described. Consequently, the polymers of such monomeric sulfonamides also have not been described heretofore.

We have now found that resinous poly N-vinyl alkane sulfonamides (poly N-vinyl alkyl sulfonamides), poly N-vinyl aromatic sulfonamides (poly N-vinyl arylsulfonamides) and poly N-vinyl aralkane sulfonamides (poly N-vinyl aralkyl sulfonamides) which contain the fundamental unit:

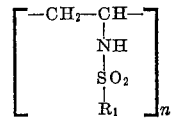

repeated $n$ times, and wherein the symbol $R_1$ represents an alkyl group, and more particularly a primary alkyl group, containing from 1 to 4 carbon atoms (e. g. methyl, ethyl, n-propyl, isopropyl, n-butyl, isobutyl or sec. butyl), an aryl group of the benzene series containing from 6 to 8 carbon atoms (e. g. phenyl, tolyl or xylyl), an aryl group of the naphthalene series containing from 10 to 12 carbon atoms (e. g., naphthyl, 1-methylnaphthyl, 2-methylnaphthyl, 2,6-dimethylnaphthyl, etc.) or an aralkyl group containing from 7 to 8 carbon atoms (e. g. benzyl or β-phenylethyl), can be prepared by reacting polyvinylamine or its salts with an organic sulfonyl chloride in the presence of an alkli-metal hydroxide. The above-defined polymers are valuable for the preparation of various compositions, films, sheets, fibers, etc., as well as being valuable as intermediates for the preparation of other useful resinous products because of the active hydrogen atom attached to the nitrogen atom.

It is, accordingly, an object of the invention to provide new resinous polymers. Another object is to provide a process for preparing such polymers. Other objects will become apparent hereinafter.

The intermediate polyvinylamine and salts thereof which are suitable for the practice of the invention can be prepared by the general process described in our copending application Serial No. 625,690, filed October 30, 1945 (now United States Patent 2,484,423, dated October 11, 1949). Suitable polyvinylamine salts are polyvinylamine hydrochloride, polyvinylamine hydrobromide, and monobasic carboxylic acid salts of polyvinylamine such as, for example, polyvinylamine acetate, polyvinylamine benzoate, etc. The organic sulfonyl chlorides which are suitable for reacting with the polyvinylamine and its salts to give the resinous polymers of the invention can be represented by the general formula:

$$R_1SO_2Cl$$

wherein $R_1$ represents an alkyl group containing from 1 to 4 carbon atoms, an aryl group of the benzene series containing from 6 to 8 carbon atoms, an aryl group of the naphthalene series containing from 10 to 12 carbon atoms and an aralkyl group of the arylated alkyl series containing from 7 to 8 carbon atoms. Specifically the organic sulfonyl chlorides include methane sulfonyl chloride, ethane sulfonyl chloride, n-propane sulfonyl chloride, isopropane sulfonyl chloride, n-butane sulfonyl chloride, isobutane sulfonyl chloride, sec. butane sulfonyl chloride, benzene sulfonyl chloride, p-toluene sulfonyl chloride, o-toluene sulfonyl chloride, m-toluene sulfonyl chloride, 1,2-dimethylbenzene-3-sulfonyl chloride, 1,2-dimethylbenzene-4-sulfonyl chloride, 1,3-dimethylbenzene-2-sulfonyl chloride, 1,3-dimethylbenzene-4-sulfonyl chloride, 1,3-dimethylbenzene-5-sulfonyl chloride, 1,4-dimethylbenzene-2-sulfonyl chloride, α-naphthalene sulfonyl chloride, β-naphthalene sulfonyl chloride, 1,4-methylnaphthalene sulfonyl chloride, 3,7-dimethylnaphthalene-1-sulfonyl chloride, benzyl sulfonyl chloride, β-phenylethyl sulfonyl chloride etc.

The amount of the sulfonyl chloride employed can be varied advantageously from just enough of the sulfonyl chloride to react with one hydrogen atom of each of the amino groups of the polyvinylamine compound to several grammoles of the sulfonyl chloride to each gram-mole of the polyvinylamine compound. However, in the case of the alkyl sulfonyl chlorides the reaction is advantageously carried out with from 3 to 10 gram-moles of the alkyl sulfonyl chloride to each gram-mole of the polyvinylamine compound. The reaction is carried out in reaction media, preferably in which the polyvinylamine and its salts are soluble, for example, in water. However, the reaction can also be carried out by starting with a suspension of the polyvinylamine salt in a liquid in which it is insoluble (e. g. in dioxane) and then adding water to the suspension, usually in the form of an aqueous solution of the alkali acceptor for the hydrogen chloride which is liberated in the reaction. The concentration of the polyvinylamine or its salts in the reaction media is not critical, since it is possible to carry out the reaction with any practical concentration, but preferably from 1 to 20 parts by weight of the polymer to each 100 parts by weight of the reaction media. The temperature of the reaction can be varied from 0° to 50° C., but preferably from 5° to 25° C. The alkali employed (e. g. potassium hydroxide, sodium hydroxide, lithium hydroxide, etc.) need be present only in an amount just sufficient to combine with the acid liberated in the reaction and with any excess of unreacted sulfonyl chloride. Advantageously, however, the alkali can be used in an amount which is at least one gram-mole greater than the number of gram-moles of the sulfonyl chloride employed.

The following examples will serve further to illustrate the poly N-vinyl sulfonamides of the invention and the manner of preparing the same.

*Example 1.—Poly N-vinylmethane sulfonamide*

8 grams of polyvinylamine hydrochloride were stirred into solution in 200 cc. of water while being cooled in an ice water bath. There were then added 10 grams of potassium hydroxide and the solution cooled to 10° C. 25 grams of methane sulfonyl chloride were then added, after which the temperature first rose to 20° C. and then gradually lowered to 5° C. A second portion of 10 grams of potassium hydroxide pellets was added and after cooling to 10° C., a second 25-gram portion of methane sulfonyl chloride was added. The resulting reaction mixture was stirred for an additional hour and then poured into a larger volume of ethanol. The precipitate of resin which formed was filtered off, washed with ethanol, then extracted in a Soxhlet extractor with methanol and dried. The dried resin was redissolved in water, the solution filtered, and the resin reprecipitated by pouring the filtered solution into a 1:1 acetone-ether mixture. The resinous precipitate of poly N-vinyl methane sulfonamide was leached in methanol and dried. It gave on analysis 18.9% of sulfur which calculates to 69% by weight of N-vinyl methane sulfonamide units.

In place of the methane sulfonyl chloride in the above example, there can be substituted an equivalent amount of ethane sulfonyl chloride to give poly N-vinyl ethane sulfonamide, of n-propane sulfonyl chloride to give poly N-vinyl n-propane sulfonamide, of isopropane sulfonyl chloride to give poly N-vinyl isopropane sulfonamide, of n-butane sulfonyl chloride to give poly N-vinyl n-butane sulfonamide, of isobutane sulfonyl chloride to give N-vinyl isobutane sulfonamide or of sec. butane sulfonyl chloride to give poly N-vinyl sec. butane sulfonamide.

In place of the polyvinylamine hydrochloride in the above example, there can be substituted an equivalent amount of polyvinylamine hydrobromide, polyvinylamine acetate, polyvinylamine α-chloropropionate, polyvinylamine o-bromobenzoate, polyvinylamine m-bromobenzoate or polyvinylamine p-bromobenzoate to give also the sulfonamides mentioned in the above example.

*Example 2.—Poly N-vinyl benzene sulfonamide*

8 grams of polyvinylamine hydrochloride were stirred into solution in 200 cc. of water containing 10 grams of potassium hydroxide. After cooling to 8° C., there were added to the solution 35 grams of benzene sulfonyl chloride. The temperature rose slowly to 13° C., at which time another 10 grams of potassium hydroxide pellets were added. This was followed by a second addition of 25 grams of benzene sulfonyl chloride. Within a few minutes, a solid resinous product began to separate out of solution. The stirring was continued for an additional hour. The precipitated resinous material was filtered out and washed with water. It was then transferred to a larger volume of ethanol in which it was insoluble and vigorously stirred. The resin was filtered off, dried and dissolved in acetone containing sufficient water to give a clear solution of the resin, and then reprecipitated. It was then filtered off, washed in water and dried over phosphorus pentoxide in vacuum at room temperature. The poly N-vinyl benzene sulfonamide thus obtained on analysis gave 15.3% of sulfur which calculates to 88% by weight of N-vinyl benzene sulfonamide units.

In place of the polyvinylamine hydrochloride in the above example, there can be substituted an equivalent amount of polyvinylamine hydrobromide, polyvinylamine acetate, polyvinylamine-α-chloropropionate or a polyvinylamine bromobenzoate, to likewise give poly N-vinyl benzene sulfonamide.

*Example 3.—Poly N-vinyl p-toluene sulfonamide*

25 grams of polyvinylamine hydrochloride were stirred into suspension in 250 cc. of dioxane. There were then added to the suspension 80 grams of p-toluene sulfonyl chloride and the mixture then kept below 25° C. during the dropwise addition of 250 cc. of aqueous 4-normal sodium hydroxide solution. The reaction commenced immediately thereafter and in a short time a resinous product separated out of solution as a sticky mass. It was dissolved in acetone containing sufficient water to give a homogeneous solution of the polymer and reprecipitated by pouring the solution into a larger volume of water. The precipitated resin was filtered out, washed well with water, leached in ethanol and then extracted in a Soxhlet extractor with ethanol. It was redissolved in acetone containing sufficient water to give a homogeneous solution of the resin and reprecipitated in ethanol. The poly N-vinyl p-toluene sulfonamide thus obtained was dried in vacuum at 70° C. Analysis of this purified product gave 15.2% by weight of sulfur equivalent to 94% by weight of N-vinyl-p-toluene sulfonamide units.

In place of the p-toluene sulfonyl chloride in the above example, there can be substituted an equivalent amount of benzyl sulfonyl chloride to give poly N-vinyl benzylsulfonamide, of 1,2-dimethylbenzene-3-sulfonyl chloride to give poly N-vinyl 1,2-dimethylbenzene-3-sulfonamide, of 1,2-dimethylbenzene-4-sulfonyl chloride to give poly N-vinyl 1,2-dimethylbenzene-4-sulfonamide, of 1,3-dimethylbenzene-2-sulfonyl chloride to give poly N-vinyl 1,3-dimethylbenzene-2-sulfonamide, of 1,3-dimethylbenzene-4-sulfonyl chloride to give poly N-vinyl 1,3-dimethylbenzene-4-sulfonamide, of 1,3-dimethylbenzene-5-sulfonyl chloride to give poly N-vinyl 1,3-dimethylbenzene-5-sulfonamide or of 1,4-dimethylbenzene-2-sulfonyl chloride to give poly N-vinyl 1,4-dimethylbenzene-2-sulfonamide.

The above mentioned sulfonamides can also be prepared by substituting for the polyvinylamine hydrochloride in the above example, an equivalent amount of polyvinylamine hydrobromide, polyvinylamine acetate or polyvinylamine benzoate.

*Example 4.—Poly N-vinyl m-nitrobenzene sulfonamide*

8 grams of polyvinylamine hydrochloride were dissolved in 100 cc. of water and added to a solution of 44.3 grams of m-nitrobenzene sulfonyl chloride in 250 cc. of chloroform. The mixture was cooled to 10° C. and stirred while 22.4 grams of potassium hydroxide in 200 cc. of water were added gradually. During the addition of the potassium hydroxide, the temperature of the reaction mixture was kept above 10° C., but below 15° C. After about 10 minutes, a solid reaction product began to separate out of solution. Then 250 cc. of chloroform were added and the reaction mixture stirred for an additional hour. The aqueous layer was decanted and methanol added to the chloroform layer. The white granular product which separated out of the chloroform-alcohol mixture was separated and washed first with methanol and then with water. It was redissolved in pyridine, the pyridine solution filtered and the resin reprecipitated by pouring the filtrate into methanol. The resulting fibrous product was washed free of chloride ion with water. The poly N-vinyl m-nitrobenzene sulfonamide thus obtained was dried for analysis. It contained 10.9% by weight of sulfur which calculates to 88% by weight of N-vinyl m-nitrobenzene sulfonamide units.

In place of the m-nitrobenzene sulfonyl chloride in the above example, there can be substituted an equivalent amount of o-nitrobenzene sulfonyl chloride to give poly N-vinyl o-nitrobenzene sulfonamide, of p-nitrobenzene sulfonyl chloride to give poly N-vinyl p-nitrobenzene sulfonamide or of o-, p- and m-bromobenzene sulfonyl chlorides to give the corresponding poly N-vinyl bromobenzene sulfonamides.

In place of the polyvinylamine hydrochloride in the above example, there can be substituted an equivalent amount of polyvinylamine hydrobromide, polyvinylamine acetate or polyvinylamine benzoate to give also the sulfonamides mentioned in the above example.

*Example 5.—Poly N-vinyl naphthalene-β-sulfonamide*

8 grams of polyvinylamine hydrochloride were dissolved in 100 cc. of water and added to a solution of 45.2 grams of naphthalene-β-sulfonyl chloride in 500 cc. of chloroform. The mixture was stirred and kept at between 10° C. and 25° C. during the addition of 25 grams of potassium hydroxide dissolved in 200 cc. of water. The reaction mixture was stirred for a total of 16 hours, after which the aqueous layer was decanted and the chloroform layer containing the resin was stirred with fresh water to remove the salt present. The aqueous layer was again decanted and the chloroform layer containing the resin stirred with methanol. The crude poly N-vinyl naphthalene-β-sulfonamide separated out of solution in the form of a white, fibrous material. It was washed with water, redissolved in pyridine, the pyridine solution filtered, and the resin reprecipitated by pouring the filtrate into a larger volume of dilute aqueous hydrochloric acid. The resin was washed with water until the washings no longer gave a test for chloride ion. It was dried for analysis. The purified poly N-vinyl naphthalene-β-sulfonamide thus obtained had a sulfur content of 13.7% by weight which calculates to approximately 100% by weight of N-vinyl naphthalene-β-sulfonamide units.

In place of the naphthalene-β-sulfonyl chloride in the above example, there can be substituted an equivalent amount of naphthalene-α-sulfonyl chloride to give poly N-vinyl naphthalene-α-sulfonamide.

In place of polyvinylamine hydrochloride in the above example, there can be substituted an equivalent amount of polyvinylamine hydrobromide, polyvinylamine acetate or polyvinylamine benzoate to give also the sulfonamides mentioned in the above example.

The preparation of the new polymeric sulfonamides of the invention can also be carried out in other reaction media, for example, in methyl alcoholic potassium hydroxide. While other inorganic alkalies are also efficacious, the higher solubility of potassium hydroxide makes it the more preferable alkaline agent. The resins of the invention show some variation in solubility. For example, poly N-vinyl methane sulfonamide is water-soluble, whereas none of the poly N-vinyl aryl sulfonamides are soluble in water.

What we claim is:

1. A process for preparing a resinous polymer containing a major portion by weight in the molecule of N-vinyl alkane sulfonamide units, wherein the alkane group contains not more than 4 carbon atoms, and a minor portion by weight in the molecule of unchanged vinylamine units, comprising dissolving in water a polyvinylamine compound selected from the group consisting of polyvinylamine, polyvinylamine hydrochloride, polyvinylamine hydrobromide, and a salt of polyvinylamine and a monobasic saturated fatty acid containing from 1 to 4 carbon atoms, adjusting and maintaining the temperature of the aqueous solution of the polyvinylamine compound of from 0 to 10° C., adding to the solution an alkali-metal hydroxide and then an alkane sulfonyl chloride having the general formula:

$$R_1SO_2Cl$$

wherein $R_1$ represents an alkyl group containing from 1 to 4 carbon atoms, in the proportions of one gram-mol of the said polyvinylamine compound to from 3 to 10 gram-mol of the said alkane sulfonyl chloride, then mixing the reaction mixture with a water-miscible saturated monohydric aliphatic alcohol containing from 1 to 4 carbon atoms, and separating the precipitate of poly N-vinyl alkane sulfonamide which forms.

2. The products obtained by the process of claim 1.

3. A process for preparing a poly N-vinyl methane sulfonamide containing a major portion by weight in the molecule of N-vinyl alkane sulfonamide units, and a minor portion by weight in the molecule of unchanged vinylamine units, comprising dissolving in water a polyvinylamine compound selected from the group consisting of polyvinylamine, polyvinylamine hydrochloride, polyvinylamine hydrobromide, and a salt of polyvinylamine and a monobasic saturated fatty acid containing from 1 to 4 carbon atoms, adjusting and maintaining the temperature of the aqueous solution of the polyvinylamine compound at from 0° to 10° C., adding to the solution an alkali-metal hydroxide and then methane sulfonyl chloride, in the proportions of one gram-mol of the said polyvinylamine compound to from 3 to 10 gram-mol of the methane sulfonyl chloride, then mixing the reaction mixture with a water-miscible saturated monohydric aliphatic alcohol containing from 1 to 4 carbon atoms, and separating the precipitate of poly N-vinyl methane sulfonamide which forms.

4. The products obtained by the process of claim 3.

5. A process for preparing a poly N-vinyl methane sulfonamide containing in the molecule approximately 69 per cent by weight of N-vinyl methane sulfonamide units, the remainder of the molecule being essentially unchanged vinylamine units, comprising dissolving polyvinylamine hydrochloride in water, adjusting and maintaining the aqueous solution of the polyvinylamine hydrochloride at from 0° to 10° C., adding potassium hydroxide and then methane sulfonyl chloride to the solution, in the proportions of one gram-mol of the said polyvinylamine hydrochloride to from 3 to 10 gram-mol of the methane sulfonyl chloride, then mixing the reaction mixture with ethanol, and separating the precipitate of poly N-vinyl methane sulfonamide which forms.

6. The poly N-vinyl methane sulfonamide prepared by the process of claim 5.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,365,340 | Hanford | Dec. 19, 1944 |
| 2,456,428 | Parker | Dec. 14, 1948 |
| 2,475,424 | Dickey | July 5, 1949 |

OTHER REFERENCES

Jones: Jour. Org. Chem., November 1944, pages 500–512.

Reynolds: Jour. Amer. Chem. Soc., April 1947, pages 911–915.

Shriner: The Systematic Identification of Organic Compounds, 2nd edition (1940), pages 48, 144, 147, 193–200, John Wiley & Sons, Inc., New York.

Mulliken: A Systematic Course of Instruction in the Identification of Organic Compounds (1937), pages 143–144, 150–153 and 145.

Marvel: Jour. Amer. Chem. Soc., vol. 51, pages 1272–1274 (1929).